June 1, 1965
T. H. HINCHCLIFFE
3,186,536
GUIDES FOR CONVEYOR BELTS
Filed Nov. 7, 1961
2 Sheets-Sheet 1
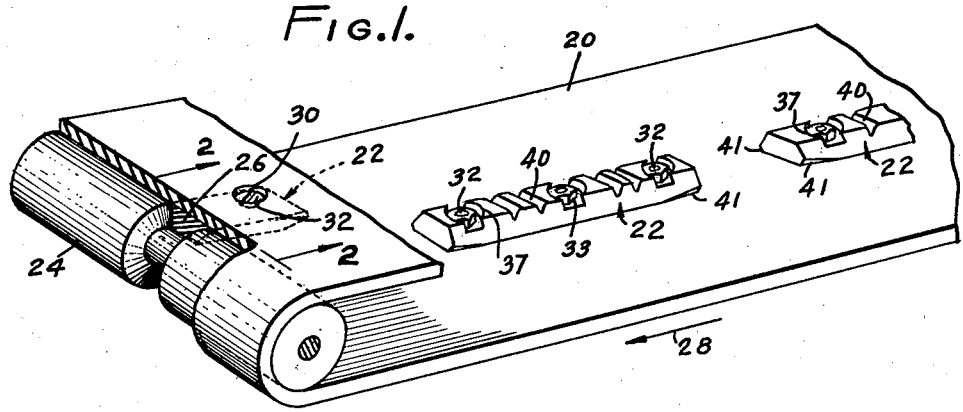
FIG. 1.
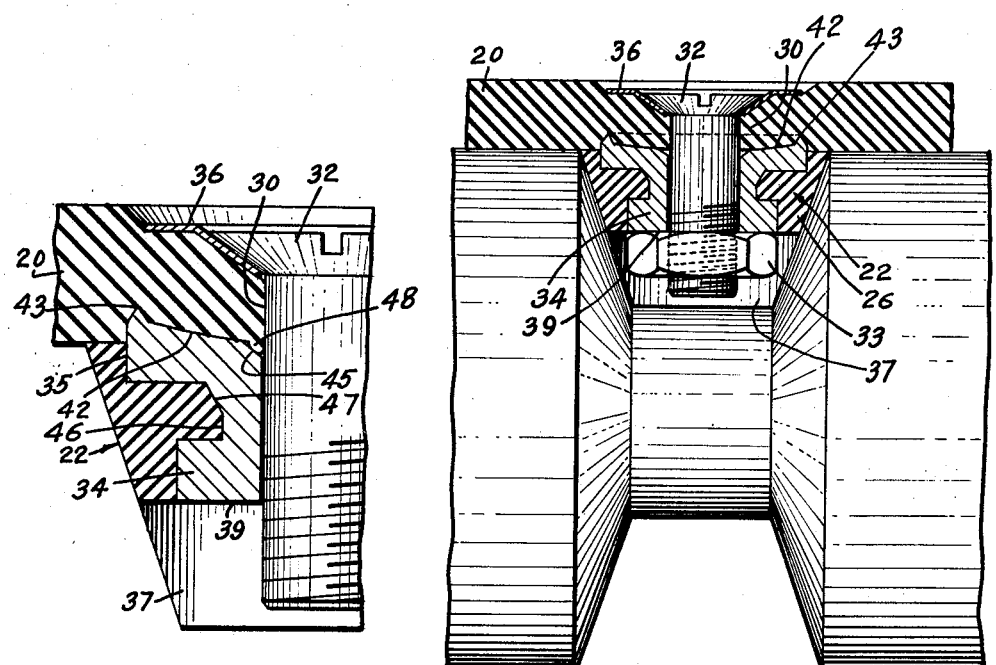
FIG. 3.
FIG. 2.
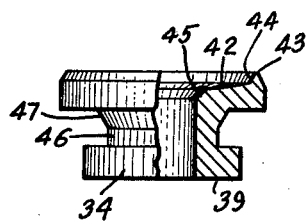
FIG. 10.
INVENTOR.
THEODORE H. HINCHCLIFFE
BY
William Jones
ATTORNEY June 1, 1965 T. H. HINCHCLIFFE 3,186,536
GUIDES FOR CONVEYOR BELTS
Filed Nov. 7, 1961 2 Sheets-Sheet 2

INVENTOR.
THEODORE H. HINCHCLIFFE
BY
ATTORNEY

_United States Patent Office_

3,186,536
Patented June 1, 1965

3,186,536
GUIDES FOR CONVEYOR BELTS
Theodore H. Hinchcliffe, Pasadena, Calif.; Emily Hinchcliffe, administratrix of said Theodore H. Hinchcliffe, deceased
Filed Nov. 7, 1961, Ser. No. 150,676
2 Claims. (Cl. 198—202)

This invention relates generally to guided conveyor belts and specifically to guided conveyor belts having a centralized V-belt guide that is attachable-detachable to and from the conveyor belt at the desire of the user.

In some section of industry, guided conveyor belts have become a necessity due to the quantities and types of materials being conveyed and further due to necessary higher speeds of operation. Trough and channel guiding have become outmoded due to the required higher operational speeds which resulted in increased wear and decreased life of conveyor belts dependent upon such means. The modern shift has been toward conveyor belts which are passed over pulleys having a central groove adapted to receive a V-section belt secured to the under or pulley side of the conveyor belt. Such belts have, for various practical reasons, been restricted to rubber coated belts with a continuous V-belt section molded to or adhesively secured to the central section of the belt under surface. Due to the cost of manufacture, such belts have been severely restricted to certain stock sizes. Also such belts are difficult to ship and handle as the underlying V-belt section renders them bulky and stiff. No practicable way has been found, heretofore, to furnish other types of belts such as fabric, leather, or other compositions, other than rubber-faced, with successful continuous-length V-belt sections.

In order to make all sizes and kinds of belts adapted to V-belt guidance, it has been found necessary to supply V-belt sections that can be easily employed on the under or pulley side of the belt and just as easily removed when the belt is required for other unguided purposes.

The principal object of my invention, therefore, is to provide V-belt sections which may be attached or detached from the central under portion of a flat conveyor belt of any size, material, or length, which V-belt sections in conjunction with V-grooved pulleys can simply transform a plain conveyor belt to a guided variety.

Another object of my invention is to supply V-section cleats which may be attached to the upper edges of a flat belt of any size or material to convert such flat belt to a trough belt in minimum time and at minimum expense.

A further object of my invention is to provide a V-belt sectioned cleat for installation on the upper surface of an otherwise flat belt in any configuration desired by the user.

Another object of my invention is to supply V-belt sections which may be secured to the under portion of a flat belt of any size or material thus converting a flat belt which is easily rolled and shipped to a guided belt form, thus obviating the expensively formed belts having continuous V-belt sections molded or vulcanized to a rubber-coated belt.

Other objects and advantages of my invention will be appreciated and discovered in view of the following detailed description and accompanying drawings wherein:

FIGURE 1 is a perspective, partly sectioned view showing my invention installed on a conveyor belt passing over a V-grooved pulley;

FIG. 2 is an enlarged, partly cross-sectioned view taken on the line 2—2 of FIG. 1;

FIG. 3 is a partial, cross-section elevation of my invention attached to a belt showing certain details of construction;

FIG. 10 is a partly cross-sectioned elevation of one of the details of my invention.

Figure 4:
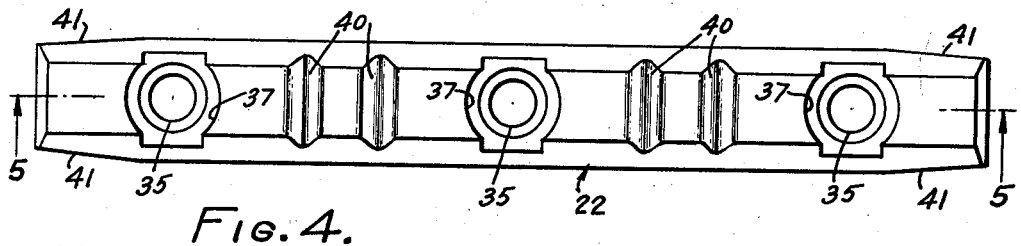
FIG. 4 is a plan view of my V-belt section.
Figure 5:
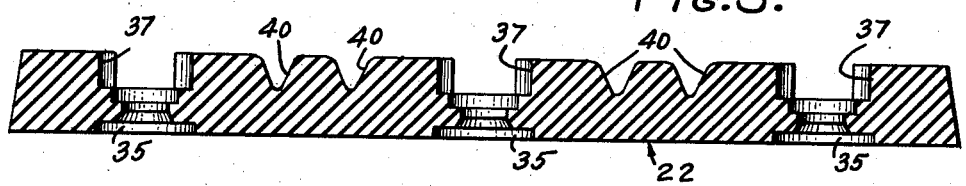
FIG. 5 is a cross-sectioned elevation of my V-belt section taken on the line 5—5 of FIG. 4.

With reference to FIG. 1, flat conveyor belt 20 is shown with my unique V-belt section 22 secured on the longitudinal center line thereof. The belt 20 is depicted as passing over the V-grooved pulley 24. A portion 26 of one of my V-belt sections is shown leaving the V-grooved pulley, assuming the direction of the belt is as shown by the arrow 28. Obviously, with this type of V-belt section guide, the conveyor belt 20 is more resistant to lateral thrusts when increased quantities of heavier materials are introduced from the side as may be necessary under certain conditions of use.

In order to utilize or convert all types of conveyor belts to the guided type, my V-belt sections 22 are secured to the longitudinal center line of the belt by means of flat-headed screws and nuts. As will be described in more detail later, suitable apertures or holes are punched, drilled, or formed along the center line of the belt and spaced as may be required for the number and size of V-belt sections to be used. As shown in FIGS. 2 and 3, the hole 30 is formed in the belt 20 of a size to snugly accept the flat-headed screw 32. This screw is inserted through the belt hole and through the smooth-bored metallic insert 34. A dished washer 36, shaped to fit the underside of the screw's flat head, may be utilized under the head of the screw to prevent it from penetrating too far below the surface of the belt 20. A nut 33 is then placed over the threaded outer shank of the screw and screwed down on to the underside of the insert 34. Since the latter is embedded in the body of the V-belt section 22, the V-belt section is held securely to the pulley side of the belt. As shown in the various figures, a plurality of screws are used to attach each V-belt section to the surface of the belt. The number of these screws may vary from two or more, depending upon the length of the V-belt section. For purposes of illustration, only three are shown.

Figures 6, 7:
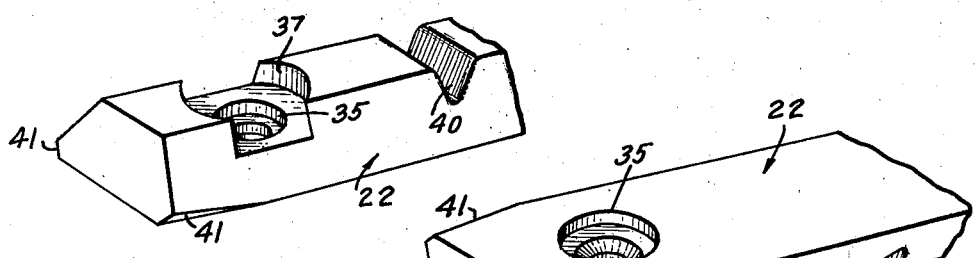
FIG. 6 is a perspective top view of the end portion of my V-belt section showing certain details of construction.
FIG. 7 is a perspective bottom view of the portion shown in FIG. 6.
Figure 8:
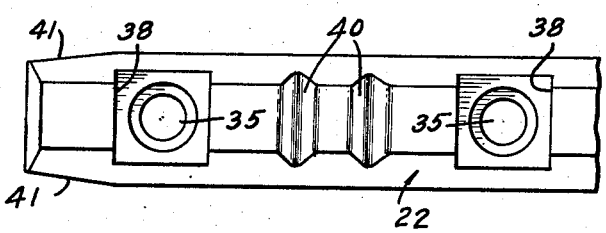
FIG. 8 is a partial plan of a modified form of my V-belt section.
Figure 9:
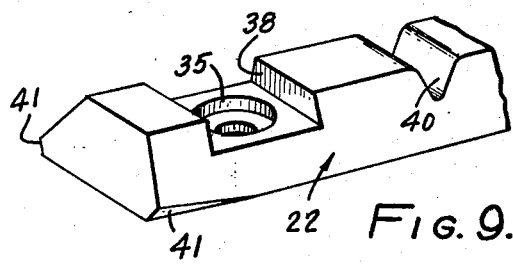
FIG. 9 is a partial perspective view of the end portion of my modified V-belt section.

A typical V-belt section 22 is illustrated in FIGS. 4–7, inclusive. These sections are shown without their metallic inserts 34. The molded apertures into which these inserts would be embedded are indicated at 35 in FIG. 5. In order to prevent the nut 33 and the partly protruding outer shank of the screw 32 from contacting the bottom of the V-groove in the pulley 24, enlarged apertures 37, concentric with the smooth bore of the metallic insert when installed, are formed to accept the nut and its socket wrench head with which it is tightened. These apertures 37 may be semi-circular, as shown in FIGS. 4 and 6, or may be cut squarely across as shown at 38 in FIGS. 8 and 9. The depth of these apertures 37 and 38 is sufficient to allow the nut to fasten down tightly on the exposed surface 39 of the insert as indicated in FIGS. 2 and 3.

Referring again to FIGS. 4–9, inclusive, the V-belt section 22 is provided with a plurality of transverse grooves 40. These grooves 40 are preferably formed as shown with rounded bottoms and transverse edges. These grooves or kerfs 40 are provided to enable the V-belt section to curve nicely around when passing through the V-groove of the pulley 24. These grooves are of a depth similar to that of the apertures 37, 38, and are preferably, but not necessarily, located symmetrically with relation to the metallic inserts 34. Where small diameter pulleys are required, the number of these grooves may be increased. Conversely, where large diameter pulleys are used, their number may be decreased.

While these V-belt sections are designed for exact installation of the belt center-line, slight errors in orientation may be corrected by tapering the ends of the section 22 as shown at 41. The degree of taper is not critical and may vary from 0 to 45°, depending upon the transverse width of the V-belt section, the separation of the various sections from each other, and the care with which the sections may be installed.

These V-belts sections may be made from any elastic or resilient material including rubber, rubber substitutes, neoprene, certain pliable plastics, leather, or other suitable compositions.

In the installation of this type of equipment on the surface of belts, one of the great difficulties encountered is the waving, rippling, or bulging of the belt surface between the points of attachment. These bulges present wear points and must be prevented. By gripping the belt firmly at the point of attachment, the slipping of the belt surface under the attachment, such as my V-belt section, is prevented and no undesired ripples, waves, or bulges can form. This firm grip is provided by the particular shape and form of the belt gripping surface of the metallic insert 34.

With reference to FIGS. 2, 3, and 10, the smooth bored metallic insert 34 is generally cylindrical in shape and its belt gripping surface 42 is in the shape of a concave, shallow, truncated cone with a circular, angular rim 43. While the contained angle 44 in this circular rim is not critical, it should be obtuse enough so as not to cut into the surface of the belt. While the bottom surface of this conical concavity inside the rim 43 may be parallel to the surface 39 of the insert, it is preferably slightly dished as shown. A decided internal chamfer 45 is provided leading from the inner surface 42 of the concavity into the smooth bore of the insert. The external cylindrical shape of the insert is so formed, with its minor diameter portion 46, as to embed itself firmly into the molded or formed V-belt section. An external chamfer 47 may be provided so as to increase the depth of the material between the two chamfers and avoid a square, sharp corner at the intersection of the minor diameter portion with the larger belt gripping portion.

It will now be clear that as the V-belt extension is placed on the belt with the bore of the insert aligned with the hole in the belt; the screw with its washer inserted through the aligned holes; and the nut is placed on the protruding shank of the screw and tightened down, the head of the screw and its washer sink down into the outer belt surface and the rim 43 sinks into the inner belt surface. As the nut is further rotated, the belt material flows down the dished surface into the chamfer 45, as indicated at 48, against the shank of the screw 32. This pressure of the belt material against the screw shank serves to lock it securely in place so that it cannot rotate under any condition of use. The pressure exerted under the dished washer 36 on the belt material assists in this self-locking operation. With the various screws so inserted and locked in place, the V-belt section is firmly attached and unsightly bulge wear-points are prevented.

The spacing of the V-belt sections, while not particularly critical, does depend, to a certain extent, on the diameter of the smallest pulley used and the length of the V-belt section used. For maximum and efficient guiding, there should be at least one complete section on the pulley at all times or two partial lengths of adjacent sections. Thus, with a 12" diameter pulley, the spacing between adjacent 9½" V-belt sections should be not more than 9 inches. With the same length of V-belt section, the spacing for a 6" diameter pulley should be not more than 4½". Closer spacing would, of course, be permissible but would not be economical.

While as indicated above, the size of the V-belt section may be regulated for conformance with the width and weight of the belt to be guided as well as the type of material to be handled. A convenient size of V-belt section which may be used on belts up to 24 inches in width and for average loads is 9½" long; a 1" base width; a ½" top width; a height of ⅝"; and a centerline distance between screw holes of 4". The grooves 40 are spaced symmetrically with relation to their adjacent screw holes. The depth of the apertures 37 and grooves 40 is ¼'.

While the screws 32 are shown as ordinary flat-headed screws having the usual screw driver slot, other forms of flat-headed screws having, say, socket heads for insertion of socket wrenches could be used. Various other modifications could be suggested by those skilled in the art, including the use of such V-belt sections on the outer surface of the belt where they would form V-belt section cleats, either located along the edges of the belt or at any other desired angle to the belt's longitudinal centerline. It is considered, however, that all such modifications would fall within the spirit of my invention and the scope of the appended claims, wherein I claim:

1. A V-belt section adapted to be removably secured to the longitudinal center line of the pulley side of a flat conveyor belt comprising, in combination:

a body of resilient material having a relatively long longitudinal axis, relatively short vertical and transverse axes, rectangular bottom belt contacting and top surfaces, two relatively long and two relatively short sides sloping inwardly from said bottom surface to said top surface;

a plurality of apertures formed in said body; and a plurality of smooth bored metallic inserts molded within said body of resilient material, said smooth bores being concentric with said apertures, said metallic inserts having a belt gripping portion protruding from the belt contacting bottom surface of said resilient body wherein said belt gripping portion comprises a circular angular rim concentric with said bore and a concave surface joining said rim with said bore.

2. A V-belt section as claimed in claim 1 further characterized by having a deep chamfer formed in said metallic insert, said chamfer being coaxial with said smooth bore and positioned between said concave surface and said bore, said deep chamfer being adapted for receiving a portion of the material of said belt when said belt is put under compression during the fastening of said V-belt section to said belt.

References Cited by the Examiner

UNITED STATES PATENTS 2,875,887  3/59  Hinchcliffe _____ 198—199
2,987,169  6/61  Hinchcliffe _____ 198—199

FOREIGN PATENTS 770,320  6/34  France.
266,096  2/27  Great Britain.

SAMUEL F. COLEMAN, *Primary Examiner.*

JULIUS E. WEST, WILLIAM B. LA BORDE,
*Examiners.*